United States Patent
Nanjundamoorthy et al.

(10) Patent No.: US 7,805,348 B2
(45) Date of Patent: Sep. 28, 2010

(54) SYSTEMS AND METHODS ENABLING INVESTMENT ACTIVITIES VIA THE CREATION AND USE OF CLIENT-SPECIFIC SECURITY FILES

(75) Inventors: Hari Nanjundamoorthy, West Windsor, NJ (US); Charles R. Smith, III, Hoboken, NJ (US); Michele Pierdinock, Hoboken, NJ (US); Donna Figlik, Chicago, IL (US); Lorraine Giordano, Hoboken, NJ (US)

(73) Assignee: CheckFree Corporation, Norcross, GA (US)

( * ) Notice: Subject to any disclaimer, the term of this patent is extended or adjusted under 35 U.S.C. 154(b) by 813 days.

(21) Appl. No.: 11/395,036

(22) Filed: Mar. 31, 2006

(65) Prior Publication Data

US 2007/0233588 A1    Oct. 4, 2007

(51) Int. Cl.
*G06Q 40/00* (2006.01)
(52) U.S. Cl. .................. 705/36 R; 705/36; 705/37; 705/39; 705/44
(58) Field of Classification Search ............ 705/36
See application file for complete search history.

(56) References Cited

U.S. PATENT DOCUMENTS

| | | | |
|---|---|---|---|
| 6,336,102 B1 * | 1/2002 | Luskin et al. | 705/35 |
| 7,249,080 B1 * | 7/2007 | Hoffman et al. | 705/36 R |
| 2002/0059107 A1 * | 5/2002 | Reich et al. | 705/26 |
| 2003/0225663 A1 * | 12/2003 | Horan et al. | 705/36 |

OTHER PUBLICATIONS

Barry Knaster "Betting on fixed asset software: put your chips on packages that meet your needs", dated Nov. 2003, ISSN: 1068-6452.*

* cited by examiner

*Primary Examiner*—Ella Colbert
*Assistant Examiner*—Hai Tran
(74) *Attorney, Agent, or Firm*—Sutherland Asbill & Brennan LLP

(57) ABSTRACT

Methods and system for performing an investment portfolio activity. A record associated with a security is stored. The record includes two or more data fields each associated with a respective security attribute, and each data field is associated with a single data value. A request to add a new data field to one of the security attributes is received, and the new data field is associated with a new data value. A customized record associated with the security is created, which includes the new data field and the new data value, and an order to perform an investment portfolio activity associated with the security is received. The investment portfolio activity is executed using the new data value included in the customized record.

14 Claims, 3 Drawing Sheets

SYSTEMS AND METHODS ENABLING INVESTMENT ACTIVITIES VIA THE CREATION AND USE OF CLIENT-SPECIFIC SECURITY FILES

FIELD OF THE INVENTION

The present invention relates to investment portfolios, and more particularly to systems and methods for the storage and retrieval of customized security account data values for use in performing investment account activities.

BACKGROUND OF THE INVENTION

Investment accounts hold stocks, bonds, mutual funds, and the like for individuals, trusts, corporations, and other investors. Investors typically utilize such accounts to achieve long and short term savings goals. The holdings of an investment account may be manipulated by the investor, such as by an investor executing securities purchases or sales via a graphical user interface and an Internet connection. An investor can be any of a number of different types of entities, including an individual or a business. The holdings of an investment account may also be manipulated by an entity managing or otherwise associated with the investment account, such as a money manager, a brokerage firm (sometimes referred to as a broker-dealer or a sponsor), or some other type of investment firm.

Conventional investment management systems store security attributes and associated authority data values in a central data file, referenced herein as a central security master. The data values for various attributes for a security can be stored in separate data fields in a single record within the central security master. Examples of typical attributes that may be stored include company name, stock ticker symbol, share price, sector, and/or industry code. Illustrative examples of data values associated with those attributes are "CheckFree" (company name), "CKFR" (stock ticker symbol), "$45.25" (share price), Financial (Sector) and "Fin" (Industry Code). It will be appreciated that the illustrative examples of attributes are not limiting, as the attributes can be anything defined by the money manager or any other individual operating the system.

As an illustrative example, a central security master containing nine (9) securities is shown as follows, with attributes including company name, stock ticker symbol, share price, and sector:

TABLE 1

Illustrative Central Security Master

| Company Name | Ticker | Share Price | Sector |
|---|---|---|---|
| CheckFree | CKFR | $36.95 | Financial |
| Corillian | CORI | $3.16 | Financial |
| First Data | FDC | $41.94 | Financial |
| Hewlett-Packard | HPQ | $26.72 | Technology |
| IBM | IBM | $81.32 | Technology |
| Intel | INTC | $25.53 | Technology |
| SBC | SBC | $23.91 | Telecommunications |
| Sprint Nextel | S | $25.96 | Telecommunications |
| Verizon | VZ | $32.79 | Telecommunications |

Using a central security master a client of the investment management system, a user entity such as a money manager or broker-dealer, may create a client-specific security file. This may be accomplished via a graphical user interface or the like that permits the selection of a subset of the securities stored in the central security master. Like the central security master, a client-specific security file may be stored within the memory of the investment management system or accessed thereby. The client-specific security file includes a subset of securities needed to manage the user's particular portfolio(s). As an example, a money manager may create a client-specific security file from the central security master shown in Table 1 as follows:

TABLE 2

Illustrative Client-Specific Security File

| Company Name | Ticker | Share Price | Sector |
|---|---|---|---|
| CheckFree | CKFR | $36.95 | Financial |
| First Data | FDC | $41.94 | Financial |
| IBM | IBM | $81.32 | Technology |
| Intel | INTC | $25.53 | Technology |
| SBC | SBC | $23.91 | Telecommunications |
| Verizon | VZ | $32.79 | Telecommunications |

After creation of the client-specific security file, a user may wish to generate additional records for securities of interest that were not found in the central security master. This may be accomplished via one or more GUIs, as are known in the art. These additional securities may include securities the user wants to track as actual or potential investments or any other securities of interest to the user. For example, a user may add securities to extend the illustrative client-specific security file of Table 2 to include Cisco and Microsoft securities, as is shown in the revised client-specific security file of Table 3. The data values located in the data fields for the new security records are illustrated in bold.

TABLE 3

Illustrative Revised Client-Specific Security File

| Company Name | Ticker | Share Price | Sector |
|---|---|---|---|
| CheckFree | CKFR | $36.95 | Financial |
| Cisco | CSCO | $17.52 | Technology |
| First Data | FDC | $41.94 | Financial |
| IBM | IBM | $81.32 | Technology |
| Intel | INTC | $25.53 | Technology |
| Microsoft | MSFT | $26.81 | Technology |
| SBC | SBC | $23.91 | Telecommunications |
| Verizon | VZ | $32.79 | Telecommunications |

The user may also wish to include additional attributes for particular securities. This may beneficially provide variability in account management, reporting functions, executing transactions, and the like. For example, where a user adds a second price attribute, such as the "Share Price 2" as is shown in Table 4 below, the first share data value may represent a discounted purchase price (as with an employee stock purchase plan) and the second share data value may represent a fair market value purchase price. Also illustrated in Table 4 is a "Sector 2" attribute added by the user.

TABLE 4

Illustrative Client-Specific Security File with Client-Added Attributes

| Company Name | Ticker | Share Price | Share Price 2 | Sector 1 | Sector 2 |
|---|---|---|---|---|---|
| CheckFree | CKFR | $36.95 | | Financial | |
| Cisco | CSCO | $17.52 | | Technology | Technology & Communications |

TABLE 4-continued

Illustrative Client-Specific Security
File with Client-Added Attributes

| Company Name | Ticker | Share Price | Share Price 2 | Sector 1 | Sector 2 |
|---|---|---|---|---|---|
| First Data | FDC | $41.94 | $41.10 | Financial | |
| IBM | IBM | $81.32 | $79.69 | Technology | |
| Intel | INTC | $25.53 | | Technology | |
| Microsoft | MSFT | $26.81 | $26.27 | Technology | |
| SBC | SBC | $23.91 | | Telecommu-nications | Technology & Communications |
| Verizon | VZ | $32.79 | | Telecommu-nications | Technology & Communications |

To handle the use of multiple potentially conflicting data values for similar attributes, conventional systems require the creation of a group definition file that defines which accounts constitute a particular group. These groups may be defined explicitly (i.e., as a list of one or more accounts) or via some rule that can dynamically determine whether a given account belongs to the group. A new group definition file would have to be created for each distinct group. The portfolio management system would then have to reference each group when performing various tasks, such as executing trades, generating reports, analyzing account performance, and the like, and explicitly override the use of a "default" security master value. As an illustrative example, a portfolio management system may contain a hard-coded software modification that, for a particular account grouping, the "Share Price 2" data value (rather than the "Share Price" data value) should be used to execute a buy, such as a buy limit order. Portfolio management functionality that could contain such customizations includes account rebalancing, various future projection and proposal generation tools, restrictions processing, reconciliation, performance analysis, and reporting.

One problem with such conventional systems to client-specific security file customization is that it requires the construction and correlation of two separate data sources—the client-specific security file and the one or more group definition files. Another problem is that the portfolio management system software must be modified for each desired alternative operation for each account grouping. Over time, the number of group definitions and software customizations may explode, adding to system complexity. Additionally, having to hard-code each alternate operation is prone to error (it may be easy to overlook an associated function that should be changed at the same time), presents implementation delay, and is inherently inefficient from a cost/effort perspective.

What is needed are systems and methods that permit users to define investment account attributes and the automatic assembly and use of different attribute values without requiring the use of one or more separate group definition files and associated hard-coded software customizations.

SUMMARY OF THE INVENTION

According to an embodiment of the invention, there is disclosed a method of performing an investment portfolio activity. The method includes storing a record associated with a security, where the record includes a plurality of data fields each associated with a respective security attribute, and where each data field is associated with a single data value; stomize a first security record. The record also includes receiving a request to add a new data field to one of the security attributes, where the new data field is associated with a new data value, and creating a customized record associated with the security, where the customized record includes the new data field and the new data value. The method also includes receiving an order to perform an investment portfolio activity associated with the security, and executing the investment portfolio activity using the new data value included in the customized record.

According to one aspect of the invention, executing the investment portfolio activity includes executing the investment portfolio activity using the new data value and at least one single data value. According to another aspect of the invention, creating a customized record includes creating a customized record including a scope data value, where the scope data value identifies that the new data value is associated with the investment portfolio activity. According to yet another aspect of the invention, the scope data value is associated with a user or client associated with an investment account for which the investment portfolio activity is performed. The scope data value can also be associated with a program corresponding to one or more investors.

The method can also include the creation of a second customized record associated with the security, where the customized record comprises a new data field, a new data value, and a scope data value. According to an aspect of the invention, the method further includes comparing the scope data value associated with the customized record to the scope data value associated with the second customized record. Comparing the scope data value associated with the customized record to the scope data value associated with the second customized record can include determining whether the scope data value associated with the customized record is associated with a precedence level that is higher or lower than that of a precedence level of the scope data value associated with the second customized record.

According to another aspect of the invention, the method can include searching the record and the customized record to determine if the record and customized record are associated with the security. According to yet another aspect of the invention, creating a customized record includes creating a customized record including a scope data value, where the scope data value identifies that the new data value is associated with the investment portfolio activity. Creating a customized record could also include creating a customized record including a scope data value that identifies a scope for which the new data value is applicable, and the investment portfolio activity is associated with the scope data value. The scope data value can be associated with a set of one or more investment accounts. Additionally, a computer-readable medium having stored thereon computer-executable instructions can perform each of the above methods.

According to another embodiment of the invention, there is disclosed a method for performing an investment portfolio activity. The method includes storing a first data value, where the first data value is associated with a security, an attribute of the security, and a first scope data value. The method also includes receiving a first instruction to perform an investment portfolio activity for an investment account associated with a first scope data value and a second scope data value, and performing the investment portfolio activity using the first data value. The method further includes storing a second data value, where the second data value is associated with the security, the attribute of the security, and the second scope data value, and receiving a second instruction to perform the investment portfolio activity for the investment account. The method also performs the investment portfolio activity using the second data value.

According to one aspect of the invention, one of the first scope data value or the second scope data value is associated with a user or client associated with the investment account. According to another aspect of the invention, one of the first scope data value or the second scope data value is associated with a program corresponding to one or more investors. According to yet another aspect of the invention, the method includes creating a customized record associated with the second scope data value and including the second data value. A computer-readable medium having stored thereon computer-executable instructions may also perform the above-described methods.

According to yet another embodiment of the invention, there is disclosed a method for performing an investment portfolio activity. The method includes storing a first data value associated with a security, an attribute of the security, and a first scope data value, and storing a second data value associated with the security, the attribute of the security, and a second scope data value. The method also includes receiving an instruction to perform an investment portfolio activity on an account associated with the first scope data value and the second scope data value, determining that the first scope data value has priority over the second scope data value based at least in part on preference rules, and performing the investment portfolio activity using the first data value.

According to yet another embodiment of the invention, there is disclosed a system for performing an investment portfolio activity. The system includes at least one storage device, operable to store a record associated with a security, where the record includes a plurality of data fields each associated with a respective security attribute, and where each data field is associated with a single data value. The system also includes a security master module, in communication with the at least one storage device. The security master module is operable to receive a request to add a new data field to one of the security attributes, where the new data field is associated with a new data value, and to create a customized record associated with the security, where the customized record includes the new data field and the new data value. The security master module is also operable to receive an order to perform an investment portfolio activity associated with the security, and to execute the investment portfolio activity using the new data value included in the customized record.

According to one aspect of the invention, the security master module includes computer-executable instructions for creating the customized record. The security master module can also be operable to execute the investment portfolio activity using the new data value and at least one single data value, and can create a customized record including a scope data value, where the scope data value identifies that the new data value is associated with the investment portfolio activity. According to another aspect of the invention, the scope data value can be associated with a user or client associated with an investment account for which the investment portfolio activity is performed. The scope data value can also be associated with a program corresponding to one or more investors. According to yet another aspect of the invention, the security master module is further operable to create a second customized record associated with the security, where the customized record comprises a new data field, a new data value, and a scope data value.

The security master module can also compare the scope data value associated with the customized record to the scope data value associated with the second customized record. Furthermore, the security master module is operable to compare the scope data value associated with the customized record to the scope data value associated with the second customized record by determining whether the scope data value associated with the customized record is associated with a precedence level that is higher or lower than that of a precedence level of the scope data value associated with the second customized record.

BRIEF DESCRIPTION OF THE DRAWINGS

Figure 1:
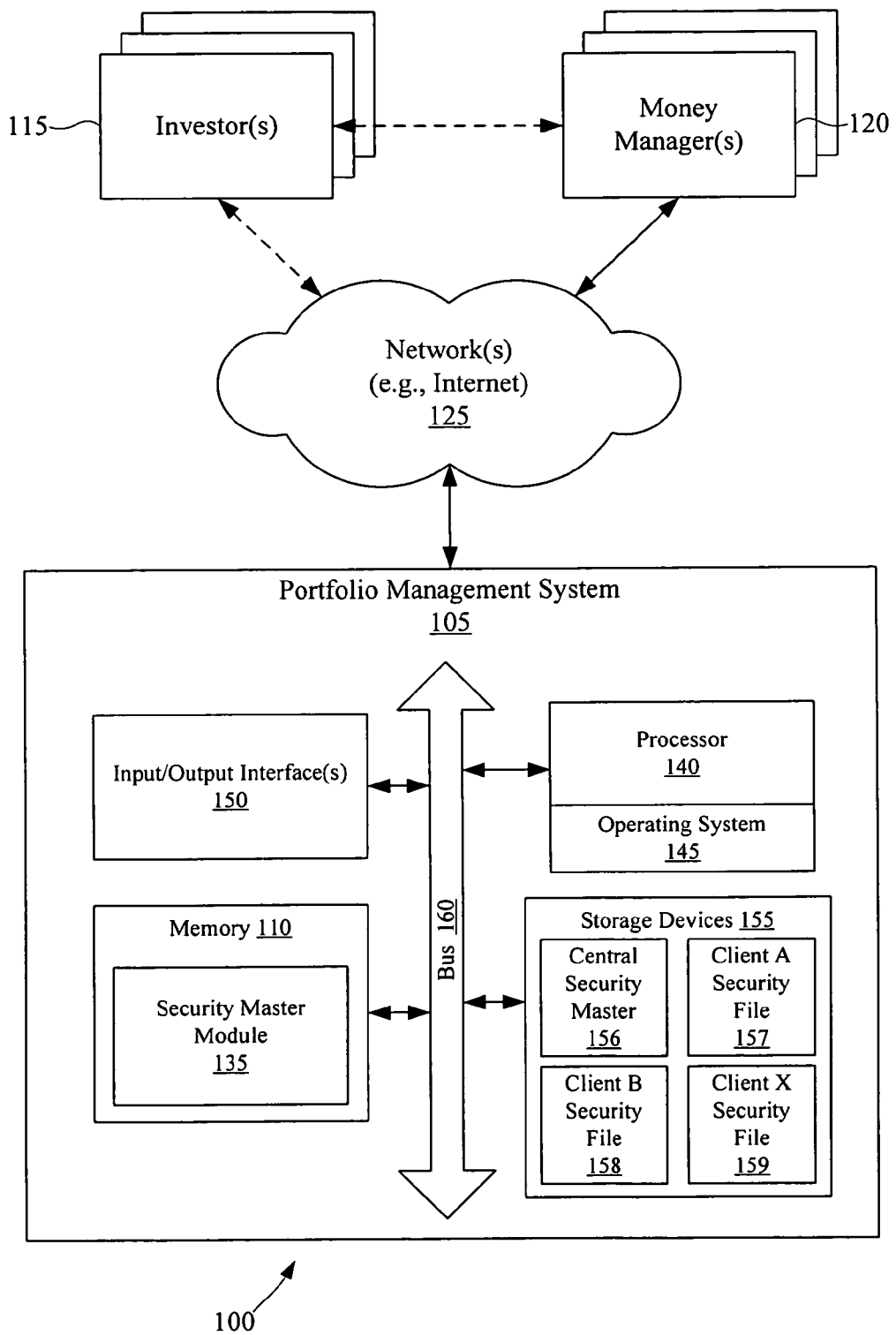

Having thus described the invention in general terms, reference will now be made to the accompanying drawings, which are not necessarily drawn to scale, and wherein:

FIG. 1 shows a portfolio management system in block diagram form, according to an embodiment of the present invention.

Figure 2:
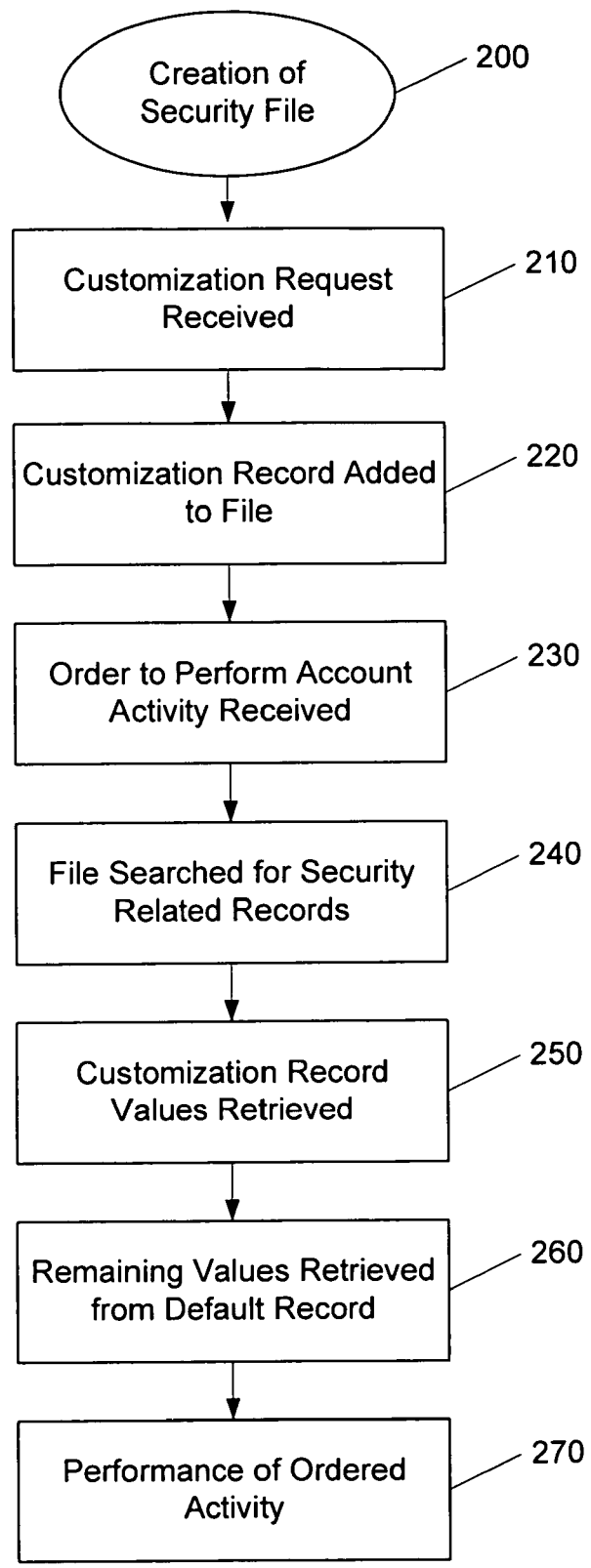

FIG. 2 is a block diagram flow chart of an account management activity, according to an illustrative embodiment of the present invention.

Figure 3:
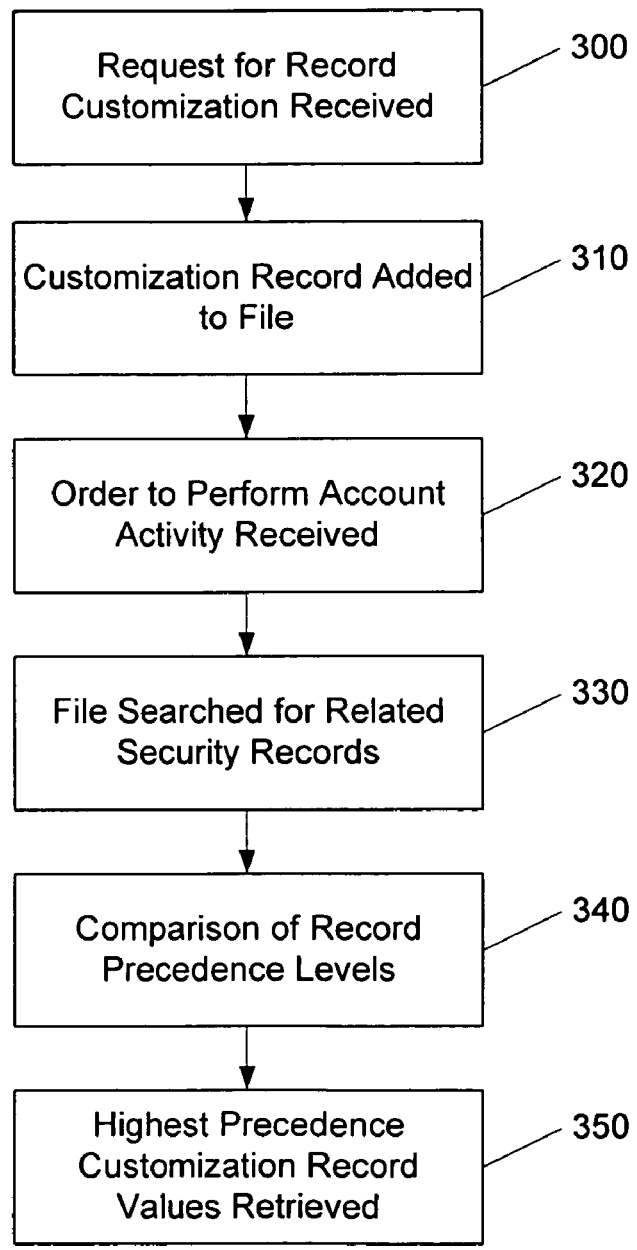

FIG. 3. is a block diagram flow chart of an account management activity, according to an illustrative embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto one or more general purpose computers, special purpose computers, or other programmable data processing apparatuses to produce a system of one or more machines, such that the instructions which execute on one or more computers or other programmable data processing apparatuses create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 1, an investment management system 100 in accordance with an illustrative embodiment of the present invention is shown. The investment management system 100 generally includes a portfolio management system 105 operable to receive instructions from one or more investors 115 and/or one or more money managers 120. Among other functions, the portfolio management system 105 can receive trade orders, such as orders to buy or sell securities, and can execute such orders. The portfolio management system 105 can also generate reports, such as performance analyses, and perform other functions via investment-related tools available to the one or more investors 115 and money managers 120. As described in greater detail below, the portfolio management system 105 is further operable to permit the generation of client-specific security files from a central security master, where each client-specific security file includes security-related records having a scope attribute that permits the use of more than one similar attribute within the client-specific security file without the use of a separate rule file. To effect such processing, the portfolio management system 105 includes at least one memory 110 and a security master module 135 stored therein. The security master module 135 aids in the creation and customization of client security files and performs record resolution where two or more records within a client-specific security file conflict.

As shown in FIG. 1, the investor(s) 115 and/or money manager(s) 120 may communicate with the portfolio management system 105 either directly or via one or more networks 125, such as a Local Area Network (LAN), a Wide Area Network (WAN), the Internet, or the like. Although the investor(s) 115 and/or money manager(s) 120 may communicate directly with the portfolio management system 105, the investor(s) 115 optionally may communicate with the money manager(s) 120, which may in turn communicate with the portfolio management system 105 on behalf of the investor(s) 115. In FIG. 1 the communication directly between the investor(s) 115 and the one or more networks 125 is illustrated with a dashed line to indicate that the communication link is optional. It should also be appreciated that other entities may communicate with the portfolio management system 105. For instance, the money manager(s) may represent one or more broker-dealers or other user entities authorized to communicate with and/or operate the system 105.

Although illustrated in FIG. 1 as communicating only with the investor(s) 115 and/or the money manager(s) 120, it should be appreciated that the portfolio management system 105 may be used by other entities, such as one or more brokers, brokerage firms, or other types of sponsors. Therefore, client security files may be generated by the portfolio management system 105 for entities other than money manager(s) 120. Communications with those entities may utilize the one or more networks 125 and/or may utilize one or more other networks (not illustrated) and/or dedicated communication links.

It will be appreciated that the methods of communicating with the portfolio management system 105 may include any method well known to those of ordinary skill in the art. Thus, the present invention is not limited to a system in which the portfolio management system 105 receives communications in a particular format or mode, or via particular hardware. For instance, although the present invention can be implemented by utilizing the Internet to facilitate communications directly between a particular investor and the portfolio management system 105, any variety and/or combination of other communication methods can be used to interact with the portfolio management system 105, such as communications via a Plain Old Telephone Service and an Interactive Voice Response system. Moreover, although not described in detail herein, it will be appreciated that some or all communications in the system 100 shown in FIG. 1 may be secure to maintain the confidentiality of data and to authenticate users of the investment management system 100.

As shown in FIG. 1, the exemplary portfolio management system 105 of the investment management system 100 generally includes a processor 140, operating system 145, bus 160, input/output interface(s) 150, and one or more storage devices 155 in addition to the aforementioned security master module 135 residing within the memory 110. The bus 160 includes data and address bus lines to facilitate communication between the processor 140, operating system 145 and the other components within the portfolio management system 105, including the memory 110, the input/output (I/O) interface(s) 150 and the one or more storage devices 155. According to one aspect of the invention, the system 105 may represent a system of distributed components that are connected by the bus 160. The processor 140 executes the operating system 145, and together the processor 140 and operating system 145 are operable to execute functions implemented by the portfolio management system 110, including executing software applications stored in the memory 110, as is well known in the art. The memory 110 may include random access memory, read-only memory, a hard disk drive, a floppy disk drive, a CD-Rom drive, a DVD-Rom drive, optical disk drive, or the like, for storing information on various computer-readable media.

Specifically, to implement the methods described herein, the processor 140 and operating system 145, with the security master module 135 and I/O interface(s) 150, receive user commands and instructions and execute the functions described herein. Among other functions, these commands include requests to build client-specific security files from a central security master, to add securities to a client-specific security file, to add attributes to a client-specific security file, and to execute other portfolio management functions, such as the execution of a trade. The security master module 135 is operable to build and revise client-specific security files responsive to user requests. According to one aspect of the invention, each client-specific security file can include records having various attributes, including records with a scope attribute to permit user-customization of the client-specific security file, as will be explained in detail below.

The security master module 135 is also operable to retrieve data values from a client-specific security file to execute functions of the portfolio management system 105, and may execute algorithms prioritizing records when multiple records have conflicting data values. Additionally, the security master module 135 is operable to provide GUIs that permit user entry of security-related information, such as security ticker symbols, company names, share prices, industry codes, sectors, and the like. The security master module 135 receives user-entered information and processes the information for storage, and later processing, in client-specific files within one or more storage devices 155. According to one aspect of the invention, the security master module 135 also permits the viewing of a client-security master by an authorized user.

One or more storage devices 155 store the central security master 156 and/or client security files 157, 158, 159 generated by users or retrieved using the security master module 135. The one or more storage devices 155 are connected to the bus 160 by an appropriate interface. The one or more storage devices 155 can include random access memory, a hard disk drive, a floppy disk drive, a CD-RW drive, DVD-RW drive, optical disk drive, or the like, for storing information on various computer-readable/writable media. In general, the one or more storage devices 155 provide volatile storage to the portfolio management system 105.

It will be appreciated that the information stored within the one or more storage devices 155 may be provided by the money manager(s) 120, the portfolio management system 110, and/or other entities in communication with the portfolio management system 110. In particular, as is shown in FIG. 1, the one or more storage devices 155 can store the central security master and/or client security files 157, 158, 159 received by or generated by the portfolio management system 105 that the security master module 135 uses in the processes and computations described hereinafter. This information may be requested and/or retrieved by the security master module 135 as necessary to execute trades, generate reports, or perform analyses.

It should be appreciated that although the security master module 135 is described herein as software residing within the memory 110, the security master module 135 may alternatively include a combination of software and hardware, or only hardware. Furthermore, although illustrated as located entirely within the portfolio management system 105, one or more of the portfolio management system 105 components can be distributed such that they are in whole or part external to the portfolio management system 105. As an illustrative example, the one or more storage devices 155 may in fact be external to the portfolio management system 105. Additionally, one or more of the central security master 156 or client security files 157, 158, 159 may be located external to the portfolio management system 105 and accessed remotely.

Further, it should be also appreciated by one of ordinary skill in the art that one or more of the portfolio management system 105 components described with respect to FIG. 1 may comprise several components, which are either local to each other or which operate in conjunction with each other to permit the security master module 135 to perform the processes described herein. One or more of the portfolio management system 105 components may also be combined and/or may be distributed on different computers, systems, platforms, and the like. Therefore, it should be appreciated that the illustrative system 100 shown in FIG. 1 is exemplary, and that almost any combination of software and/or hardware may be utilized to perform the functions described herein. The methods and processes implemented by the portfolio management system 105 and the security master module 135 will next be described with reference to FIGS. 2 and 3.

Using the portfolio management system 105, and more particularly, one or more GUIs and functionality of the security master module 135, a user can build a client-specific security file by deriving information from the central security master 156. For instance, the client-specific security file may be the file described above with respect to Table 2, and may include attributes such as a company name, stock ticker symbol, share price, sector, and the like. A user may then use the security master module 135 to expand the client-specific security file by adding additional security records. Thus, a user may utilize GUIs or the like to generate the client-specific security file of Table 3, reproduced immediately below in Table 5:

TABLE 5

Illustrative Revised Client-Specific Security File

| Company Name | Ticker | Share Price | Sector |
|---|---|---|---|
| CheckFree | CKFR | $36.95 | Financial |
| Cisco | CSCO | $17.52 | Technology |
| First Data | FDC | $41.94 | Financial |
| IBM | IBM | $81.32 | Technology |
| Intel | INTC | $25.53 | Technology |
| Microsoft | MSFT | $26.81 | Technology |
| SBC | SBC | $23.91 | Telecommunications |
| Verizon | VZ | $32.79 | Telecommunications |

A user may also customize their client-security file using GUIs and functions provided by the security master module 135. Customization can include not only the entry of additional records (i.e., each record is a row in the above illustrative client-security file of Table 5), but also the addition of new data fields associated with an existing attribute, or the addition of new attributes. For instance, a user may wish to add a new data value as an alternative "share price" even though the share price data field and a share price data value already exist. As is explained in further detail below, the generation of a new record permits the security master module 135 to utilize preference rules so that the correct data values are used to effect portfolio management system functions, such as the execution of trades, the generation of reports, and the like.

Table 6 shows an illustrative, customized client-specific file after the addition of three alternative share price data values and three sectors for securities already part of the client-specific security file.

TABLE 6

Illustrative Client-Specific Security File After Customization

| Scope | Company Name | Ticker | Share Price | Sector |
|---|---|---|---|---|
| | CheckFree | CKFR | $36.95 | Financial |
| | Cisco | CSCO | $17.52 | Technology |
| Program A | — | CSCO | — | Technology & Communications |
| | First Data Corporation | FDC | $41.94 | Financial |
| User B | — | FDC | $41.10 | — |
| | IBM | IBM | $81.32 | Technology |
| Client C | — | IBM | $79.69 | — |
| | Intel | INTC | $25.53 | Technology |
| | Microsoft | MSFT | $26.81 | Technology |
| Client C | — | MSFT | $26.27 | — |
| | SBC | SBC | $23.91 | Telecommunications |
| Program A | — | SBC | — | Technology & Communications |
| | Verizon | VZ | $32.79 | Telecommunications |
| Program A | — | VZ | — | Technology & Communications |

As illustrated in Table 6, when a user wishes to add an alternative or secondary data value (referred to hereinafter as a customized data value) to an existing attribute, a new data field is created to hold the customized data value. This new data field is generated as a new record entry that is associated with a security. For instance, in the above illustrative example, the customized share price of $41.10 is associated with the stock ticker symbol "FDC". The share price and stock ticker symbol are established by the security master module 135 as a new record in the client-specific file. The new data field and new record entry are also associated by the security master module 135 with a scope data value added to the record by the security master module 135. According to one aspect of the invention, the scope data value is used to identify the scope to which the newly added customized data value will apply.

According to one aspect of the invention, the scope data value can be a user, program, or client. A user is an individual "operator" of a portfolio management system, such as a trader or financial advisor, and can be associated with one or more investment accounts. A program is a specific product or service offering to investors. It should be appreciated that investment accounts belonging to different investors may all be associated with the same program. A client is an entity, such as a money manager or broker, that offers investment services to a plurality of investors, or alternatively a client may be an individual investor. According to one aspect of the invention, a client may be a user of the investment management system 100. In either case, the set of accounts associated with a client may span multiple programs. When performing an investment portfolio activity, such as trading a security, generating reports, and the like, the security master module 135 will know the identity of the processing context (i.e., exactly what user, program, and client a given account is associated with, to the extent defined). It should be appreciated that although the invention is described above with respect to user, program and client scope data values, other scope data values are possible. For example, another scope data value that may be used is a style scope data value. A style reflects an investment approach defined by a particular mix of assets, as is described in greater detail in U.S. patent application Ser. No. 11/146,015, filed Jun. 7, 2005 and titled "Automated Actions Based on Restrictions", the entire contents of which are incorporated herein by reference as if set forth fully herein. According to one aspect of the invention, a program may also be associated with multiple styles, and many investment accounts may be associated with the same style. It will be appreciated that other scope data values could be implemented by the present invention to define relationships between a security, account, user, program, investment style, and the like.

The security master module will use the identity of the processing context of the account to determine what data values to use when performing an investment portfolio activity. In particular, after locating client-specific security file records for a security in question that apply to the identified scope, the security master module 135 will dynamically assemble the correct set of data values to use to permit the portfolio management system 105 to execute a particular activity. As an illustrative example, referring to the client-specific security file shown in Table 6, in a processing context of Client C, the security master module 135 would associate the share price of $79.69 with IBM instead of associating the default share price of $81.32. The security master module 135 will then retrieve the remaining data values corresponding to the security from the default record in the client-master file, such as the data value of "Technology" within the "Sector" attribute. Thus, the security master module 135 utilizes the scope data values associated with customized records to retrieve the correct data values from the one or more client security files 157, 158, 159 for use in executing functions of the portfolio management system. Because each customized data value is associated with a particular scope, the security master module 135 can quickly accomplish the above tasks without requiring the creation of a separate group definition file to instruct the system 105 what data values to use.

It will be appreciated that multiple customization records could apply to an investment portfolio activity to be executed by the portfolio management system 105. In many of those situations, a conflict between data values may exist. For example, as shown in the illustrative client-specific security file of Table 7, User B may be associated with Program A. If a requested action on behalf of User B for FDC is requested, two different share price data values could be applicable to the requested action—the Program A price of $41.56 and the User B price of $41.10.

TABLE 7

Illustrative Client-Specific Security File After Customization

| Scope | Company Name | Ticker | Share Price | Sector |
|---|---|---|---|---|
| | CheckFree | CKFR | $36.95 | Financial |
| | Cisco | CSCO | $17.52 | Technology |
| Program A | — | CSCO | — | Technology & Communications |
| | First Data Corporation | FDC | $41.94 | Financial |
| Program A User B | — | FDC | $41.56 | — |
| | — | FDC | $41.10 | — |
| | IBM | IBM | $81.32 | Technology |
| Client C | — | IBM | $79.69 | — |
| | Intel | INTC | $25.53 | Technology |
| | Microsoft | MSFT | $26.81 | Technology |
| Client C | — | MSFT | $26.27 | — |
| | SBC | SBC | $23.91 | Telecommunications |
| Program A | — | SBC | — | Technology & Communications |
| | Verizon | VZ | $32.79 | Telecommunications |
| Program A | — | VZ | — | Technology & Communications |

According to one aspect of the invention, the security master module of the present invention can resolve such conflicts via precedence ordering of the records according to their scope. For instance, the security master module 135 could be configured such that a user-level record may take precedence over a program-level record. Similarly, a style-level record may take precedence over a program-level record, and a program-level record may take precedence over a client-level record. All scoped records, including a client-level record, may also take precedence over the default record found in the master file. It should be understood that in different embodiments of the present invention, different scopes and different ordering of precedence may be applied. According to one aspect of the invention, precedence rules can also be tied to an investment activity requested to be performed. Thus, while the precedence rules above are described as set regardless of an activity to be implemented by the system, they may also vary based on activity. For instance, there may be a first preference rule set for a trading activity, and a second, different, rule set for a reporting activity. The preference rules may therefore be stored in a memory and accessed based on the activity of the system requested by a user.

Next, FIG. 2 depicts exemplary account management processing performed in accordance with an illustrative embodiment of the present invention. The method commences with the creation of a client-specific security file (block 200). This file may be used to effect the execution of any number of various account processing capabilities. This file contains data values (associated with attributes) for a number of securities, and a record within the client-specific security file is created for each security. These client-specific security file data values may be referred to as default data values.

A request is then received by the portfolio management system to customize a particular security record (block 210). The request (block 210) may be received from an entity using the portfolio management system, such as a money manager or broker, in order to perform portfolio management actions, such as executing what-if scenarios, performing account rebalancing, generating performance or other reports, or using other features or tools of the portfolio management system. Once the request to customize a client-specific file is received by the security master module 135, a customized record is created (block 220) and added to the existing client-specific data file. The customized record may contain any number of data values, but at a minimum identifies a security (e.g., via a stock ticker symbol data value), a scope of applicability, and at least one other data value (e.g., a stock price). The latter, which may be referred to as a customized data value, is typically an alternative data value for an attribute previously existing in the client-specific file, and may override the default data value for the attribute that exists prior to customization in certain situations.

As noted, the customized record is also associated with at least one scope data value. The scope data value, as detailed above, identifies the scope of accounts to which the newly added record will apply. For example, a particular customization may be identified by the scope data value as applicable to accounts owned by a particular client. In other words, the customized record is only used for executing portfolio account activities involving the identified security within the identified account scope.

Once the customized record is created, the system receives an order to perform an investment account management action which is associated with a particular account (block 230). The investment account action may be any action that can be taken using the portfolio management system that leverages use of the data stored within the client security file. Furthermore, the investment account action will involve or be associated with a security for which at least one record exists in the client security data file. The security master module will identify the applicable client security file from the investment account action order and search the data file (block 240) for each record associated with both the security identified in the order and an account scope that conforms to the current processing context.

According to one aspect of the invention, two records may be associated with a security: an original record and an alternative (or customized) record associated with a scope data value. The security master module 135 will analyze the records to determine their respective scopes. Because the customized record has a scope data value and the default record does not, the security master module 135 will determine that the customized record has precedence over the original record. In particular, the determination will be made based on a precedence algorithm accessed by the master module 135 that instructs the master module that records having a corresponding scope data value always take precedence over those with no scope data value. Therefore, the values from the customized record associated with the security are retrieved by the security master module 135 for use in performing the investment account management action (block 250). Data values for attributes that do not have an alternative value in the customized record may be obtained from the original record (block 260). The method concludes with the execution of the order (block 270).

FIG. 3 depicts trade order processing performed in accordance with another illustrative example of the present invention. The method commences with the receipt of a request by the portfolio management system to customize a particular security record (i.e., within a client-specific file) that has been previously customized (block 300). For instance, the received request may be to associate a secondary share price with a particular security for a different account scope. Upon receipt of the request to customize a security record, a further customized record is created (block 310) and is added to the existing data file.

Following the creation of the customized record (block 310), the system receives an order to perform an investment portfolio activity (including a management action) associated with a particular account (block 320). The investment account action will involve a security for which at least one record exists in the client-security file. Next, the data file is searched (block 330) for each record associated with both the security identified in the order and an account scope that conforms to the current processing context. The method compares the precedence levels for each record retrieved (block 340). The customization record with the highest precedence level is selected. Once the highest precedence customization record is selected, the security master module 135 retrieves the account attribute value from the selected customization record for used in executing the ordered account action (block 350).

According to one aspect of the invention, the security master module 135 facilitates the construction of the client-specific security file. Therefore, the security master module 135 may include one or more GUIs for users to perform data entry and manipulation of the portfolio management system data files. For instance, the GUIs can support the creation and revision of a central security master, and the creation and revision of client-specific files derived from the central security master. As discussed above, this may include the addition of records to client-specific files that did not previously exist in the central security master. The GUIs may also permit the creation of secondary records, which may contain the definition of a scope, the specification of which field or fields are to be associated with the scope, and alternate values for these fields. The user may also generate preference rules associated with scopes. Other GUIs may facilitate the entry of other user-provided information or system customization as described in detail herein.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

That which is claimed:

1. A computer-implemented method for performing an investment portfolio activity, comprising:

storing, in a computer memory, a plurality of record entries, including a first record entry and a second record entry that are both associated with a first security, wherein the first record entry stores a first data value for an attribute associated with the first security, and the second record entry stores a second data value for the attribute associated with the first security, wherein the first data value for the attribute is different from the second data value for the attribute, wherein the attribute associated with the first security is either (i) a share price associated with the first security, or (ii) a sector associated with the first security, wherein the first record entry is associated with a first scope defining when the first record entry can be utilized, wherein the second record entry is associated with a second scope defining when the second entry can be utilized;

receiving an instruction to perform one of (i) trading one or more securities, (ii) generating one or more reports, (iii) executing one or more "what if" scenarios, or (iv) performing account rebalancing;

determining that the received instruction is associated with the first security, the first scope, and the second scope;

identifying the first record entry and the second record entry based at least in part upon the determined association of the received instruction with the first scope, the second scope, and the first security;

determining that the second scope has priority over the first scope based upon a precedence ordering between the first scope and the second scope; and performing, in accordance with the received instruction, the one of (i) trading one or more securities, (ii) generating one or more reports, (iii) executing one or more "what if" scenarios, or (iv) performing account rebalancing using the second data value of the attribute from the second record entry, wherein the prior steps are executed by one or more computers associated with a portfolio management system.

2. The method of claim 1, wherein the first scope is a default scope.

3. The method of claim 2, wherein the default scope is indicated by the first record entry lacking a data value for a scope attribute.

4. The method of claim 1, wherein the first scope and second scope are different ones of a default scope, a style scope associated with an investment style, a user scope associated with an operator of the portfolio management system, a program scope associated with a product or service offered to investors, or a client scope associated with an investor.

5. The method of claim 1, wherein the first record entry includes additional data values for additional attributes, wherein the one of (i) trading one or more securities, (ii) generating one or more reports, (iii) executing one or more "what if" scenarios, or (iv) performing account rebalancing is performed using at least one of the additional data values from the first record entry.

6. The method of claim 1, wherein the precedence ordering is provided by a precedence algorithm, wherein the precedence algorithm provides a respective precedence ordering for each of a plurality of respective investment portfolio activities.

7. The method of claim 1, wherein the plurality of record entries are derived from a security master file of the portfolio management system.

8. A computer-implemented system for performing an investment portfolio activity, comprising:

at least one storage device, wherein the at least one storage device stores a plurality of record entries, including a first record entry and a second record entry that are both associated with a first security, wherein the first record entry stores a first data value for an attribute associated with the first security, and the second record entry stores a second data value for the attribute associated with the first security, wherein the first data value for the attribute is different from the second data value for the attribute, wherein the attribute associated with the first security is either (i) a share price associated with the first security, or (ii) a sector associated with the first security, wherein the first record entry is associated with a first scope defining when the first record entry can be utilized, wherein the second record entry is associated with a second scope defining when the second entry can be utilized;

at least one processor in communication with the at least one storage device, wherein the at least one processor is configured to computer-executable instructions to:

receive an instruction to perform one of (i) trading one or more securities, (ii) generating one or more reports, (iii) executing one or more "what if" scenarios, or (iv) performing account rebalancing;

determine that the received instruction is associated with the first security, the first scope, and the second scope;

identify the first record entry and the second record entry based at least in part upon the determined association of the received instruction with the first scope, the second scope, and the first security;

determine that the second scope has priority over the first scope based upon a precedence ordering between the first scope and the second scope; and perform, in accordance with the received instruction, the one of (i) trading one or more securities, (ii) generating one or more reports, (iii) executing one or more "what if" scenarios, or (iv) performing account rebalancing using the second data value of the attribute from the second record entry.

9. The system of claim 8, wherein the first scope is a default scope.

10. The system of claim 9, wherein the default scope is indicated by the first record entry lacking a data value for a scope attribute.

11. The system of claim 8, wherein the first scope and second scope are different ones of a default scope, a style scope associated with an investment style, a user scope associated with an operator of the portfolio management system, a program scope associated with a product or service offered to investors, or a client scope associated with an investor.

12. The system of claim 8, wherein the first record entry includes additional data values for additional attributes, wherein the processor is configured to perform the one of (i) trading one or more securities, (ii) generating one or more reports, (iii) executing one or more "what if" scenarios, or (iv) performing account rebalancing using at least one of the additional data values from the first record entry.

13. The system of claim 8, wherein the precedence ordering is provided by a precedence algorithm, wherein the precedence algorithm provides a respective precedence ordering for each of a plurality of respective investment portfolio activities.

14. The system of claim 8, wherein the plurality of record entries are derived from a security master file of the portfolio management system.

* * * * *